United States Patent
Guercioni (10) Patent No.: US 8,561,447 B2
(45) Date of Patent: Oct. 22, 2013

(54) TWISTING DEVICE ADAPTED TO SIMULTANEOUSLY TWIST A PLURALITY OF ELECTRIC BAR CONDUCTORS FOR MAKING A STATOR OR ROTOR WINDING FOR AN ELECTRIC MACHINE AND AN EXTRACTOR ASSEMBLY SUITABLE FOR COOPERATING WITH SAID TWISTING DEVICE

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,726

(22) PCT Filed: Apr. 23, 2010

(86) PCT No.: PCT/IT2010/000174
§ 371 (c)(1),
(2), (4) Date: Jan. 27, 2012

(87) PCT Pub. No.: WO2011/132207
PCT Pub. Date: Oct. 27, 2011

(65) Prior Publication Data
US 2013/0025737 A1 Jan. 31, 2013

(51) Int. Cl.
*B21D 11/14* (2006.01)
*H02K 15/02* (2006.01)
(52) U.S. Cl.
USPC ............................................. 72/299; 29/598

(58) Field of Classification Search
USPC .................. 72/295, 298–301, 308, 311, 316; 29/596, 598, 874, 882
See application file for complete search history.

(56) References Cited

U.S. PATENT DOCUMENTS

| 2005/0081365 A1* | 4/2005 | Gorohata et al. ............... 29/596 |
| 2005/0166393 A1 | 8/2005 | Sawada |
| 2007/0180681 A1* | 8/2007 | Kato et al. ...................... 29/596 |
| 2009/0265909 A1 | 10/2009 | Guercioni |

* cited by examiner

*Primary Examiner* — Debra Sullivan
(74) *Attorney, Agent, or Firm* — Tarter Krinsky & Drogin LLP (57) ABSTRACT

A twisting device (10) is described adapted to simultaneously twist a plurality of bar electric conductors (11) for making a stator or rotor winding for an electric machine, comprising: at least one first body (12) extending around a twisting axis (Z-Z) and comprising a first circular array of channels (15) having center on such an axis (Z-Z); and—at least one second body (13), extending around and coaxial with the first body (12), comprising a second circular array of channels (16) with center on the twisting axis (Z-Z); associated with each of the channels (15) of at least one of said first and second arrays, a channel extension groove (15A) extending longitudinally in a direction parallel to the twisting axis (Z-Z) and projecting from the respective channel (15) in a direction (CC) circumferential with respect to said axis (Z-Z).

12 Claims, 6 Drawing Sheets

TWISTING DEVICE ADAPTED TO SIMULTANEOUSLY TWIST A PLURALITY OF ELECTRIC BAR CONDUCTORS FOR MAKING A STATOR OR ROTOR WINDING FOR AN ELECTRIC MACHINE AND AN EXTRACTOR ASSEMBLY SUITABLE FOR COOPERATING WITH SAID TWISTING DEVICE

CROSS REFERENCE TO RELATED APPLICATIONS

This application is based on International Application No. PCT/IT2010/000174, filed on Apr. 23, 2010, the contents of which are incorporated herein by reference.

BACKGROUND OF THE INVENTION

The present description refers to a twisting device suitable for simultaneously twisting a plurality of bar electric conductors for making a stator or rotor winding of an electric machine. The present description also refers to an extractor assembly suitable for cooperating with such a twisting device.

It is known to make stators or rotors for electric machines having a stator/rotor core in which a plurality of slots are provided and also comprising a plurality of bar electric conductors inserted into the aforementioned slots and variously interconnected with one another to form one or more stator/rotor windings. The aforementioned stator/rotor windings with bar conductors are commonly called bar stator/rotor windings.

In order to make the aforementioned stator/rotor windings, a twisting device is known to be used, at least in a partially automated manner, suitable for shaping the stator/rotor winding conductors from preformed or bent bar conductors, each having a first and a second arm arranged relatively close to one another or arranged side by side. The known twisting device comprises at least one first body extending around a twisting axis and at least one second body extending around the first body and coaxial with this latter. Such a first and second body are provided with a first and a second circular array of channels, respectively, having centre on the twisting axis. In order to form the winding conductors, a plurality of the aforementioned bar conductors is inserted through a face of the twisting device in the channels provided on the first and on the second body. More in particular, the arms of each bar conductor are inserted into a channel of the first array and in a channel of the second array, respectively. Once the bar conductors have been inserted into the channels, the first and/or the second body are set in rotation around the twisting axis to separate the arms of each bar conductor from one another by an amount equal to a predetermined number of stator or rotor slots.

At the end of such a twisting operation, the winding conductors thus formed are at least partially extracted from the twisting device and finally removed from it through a suitable clamp assembly to subsequently be arranged in the respective slots of the stator or rotor core.

In particular, to extract the winding conductors an extractor assembly is typically used situated directly below the twisting device. Usually, the extractor assembly comprises a first and a second circular array of extraction elements or extraction bars, which are arranged angularly and axially aligned to the channels of the first and of the second body of the twisting device, respectively. Such extraction bars can be moved from the bottom upwards through actuators so that the respective upper end portions can be inserted into the channels of the twisting device so as to lift the winding conductors. A twisting device, an extractor assembly and a clamp assembly of the aforementioned type are described for example in the patent application published as US 2009/0265909.

During the step in which the winding conductors are being extracted from the twisting device, it can occur that some of the extraction bars bend in an undesired manner. This can, for example, be due to an uneven stress on the extraction bars during extraction, which causes in particular a greater axial load on some of such bars. Such an undesired bending of the extraction bars, in an automated process for simultaneously extracting a plurality of winding conductors housed in the channels of the twisting device, can lead to a stop of the production process and to the need to replace or repair the possibly damaged, components, particularly the extraction bars themselves.

It should be observed that such a drawback is experienced more as the length of the extraction bars of the extractor assembly increases. This is particularly important, since there is currently the need to make stator/rotor cores, and consequently also winding conductors, having an increasing axial extension so as to obtain greater performance of the electric machines in which such components are installed. This leads to the need of having twisting devices and extractor assemblies available having channels with increasing depth and extraction bars with increasing length, respectively, which leads to an increase of the possibility of there being the aforementioned drawbacks.

There is thus the need to have a twisting device available suitable for simultaneously twisting a plurality of bar electric conductors, which is, at least partially, able to avoid the aforementioned drawbacks with reference to the prior art.

BRIEF SUMMARY OF THE INVENTION

The present description has the purpose of providing a twisting device of the aforementioned type which makes it possible to satisfy the aforementioned need.

Such a purpose is achieved by means of a twisting device as defined in general in the attached first claim in its most general form and in the dependent claims in some of its particular embodiments.

Another object of the present invention is an extractor assembly and also an apparatus for making a stator or rotor pack of an electric machine.

BRIEF DESCRIPTION OF THE DRAWINGS

The invention shall become clearer from the following detailed description of its embodiments given as an example and therefore in no way limiting in relation to the attached drawings, in which.

DETAILED DESCRIPTION OF THE INVENTION

For the sake of the present description by "flat" or "square" bar conductor it is understood a bar conductor having four substantially flat sides, each joined at adjacent sides, typically by a round corner.

Therefore, the words "flat" or "square" or equivalent words used to describe the cross section of a bar conductor are used with a general meaning and must not be interpreted to exclude the fact that such bar conductors have significantly rounded corners which join the substantially flat sides. The expression "flat conductor" should be taken in the sense that the conductor has two opposite sides the distance of which is greater with respect to the distance between the remaining two opposite sides. For the sake of the present description the expression "rectangular conductor" should be taken as a generalisation of a flat conductor and of a square conductor, since the square conductor is a special case of rectangular conductor, in which the four sides have the same size.

Figure 1:
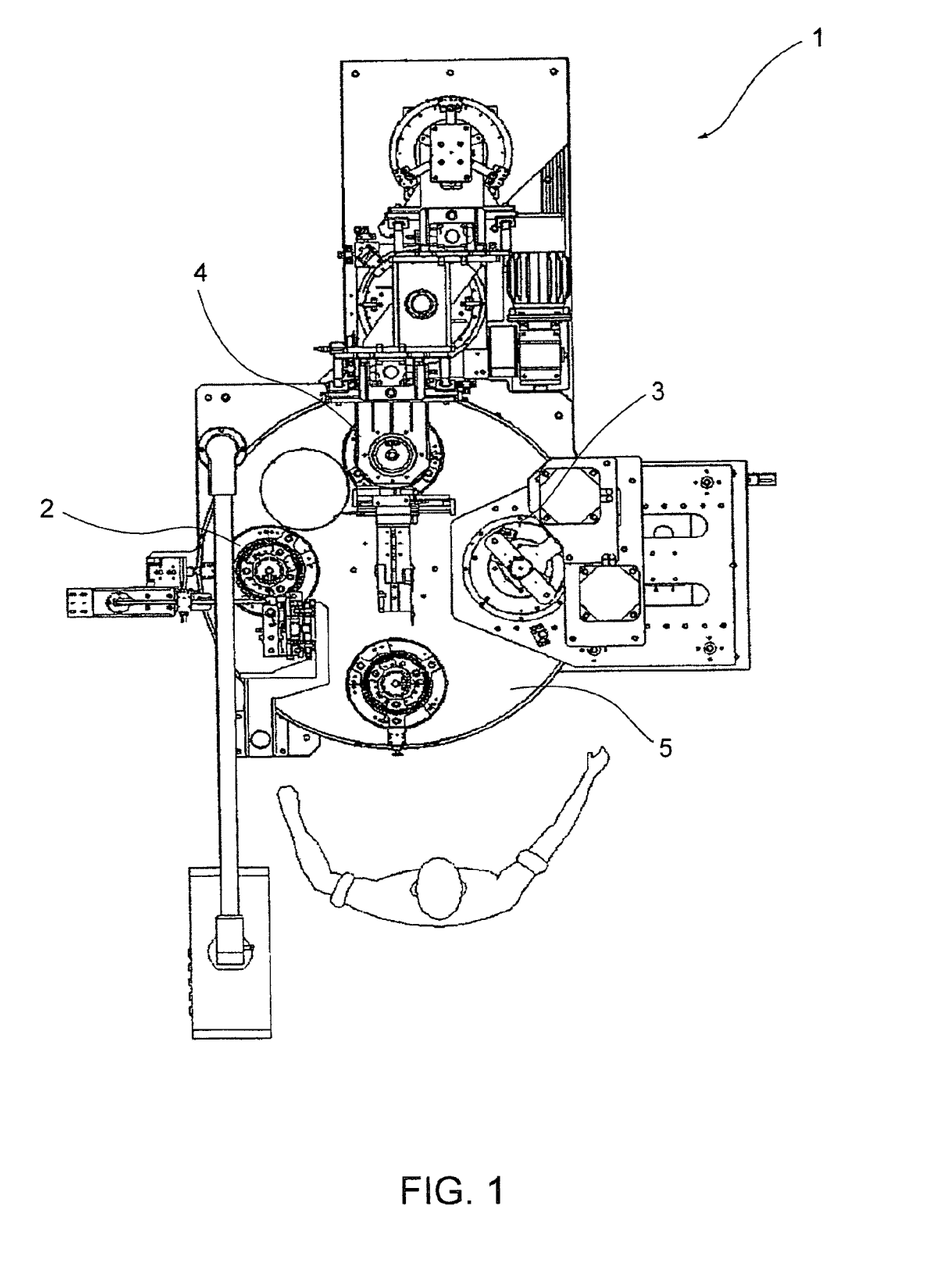
FIG. 1 is a top view showing as a whole an apparatus comprising a twisting device.

FIG. 1 represents in general an apparatus 1 comprising a plurality of working stations 2, 3, 4, for making a stator or rotor pack of an electric machine.

Figure 2:
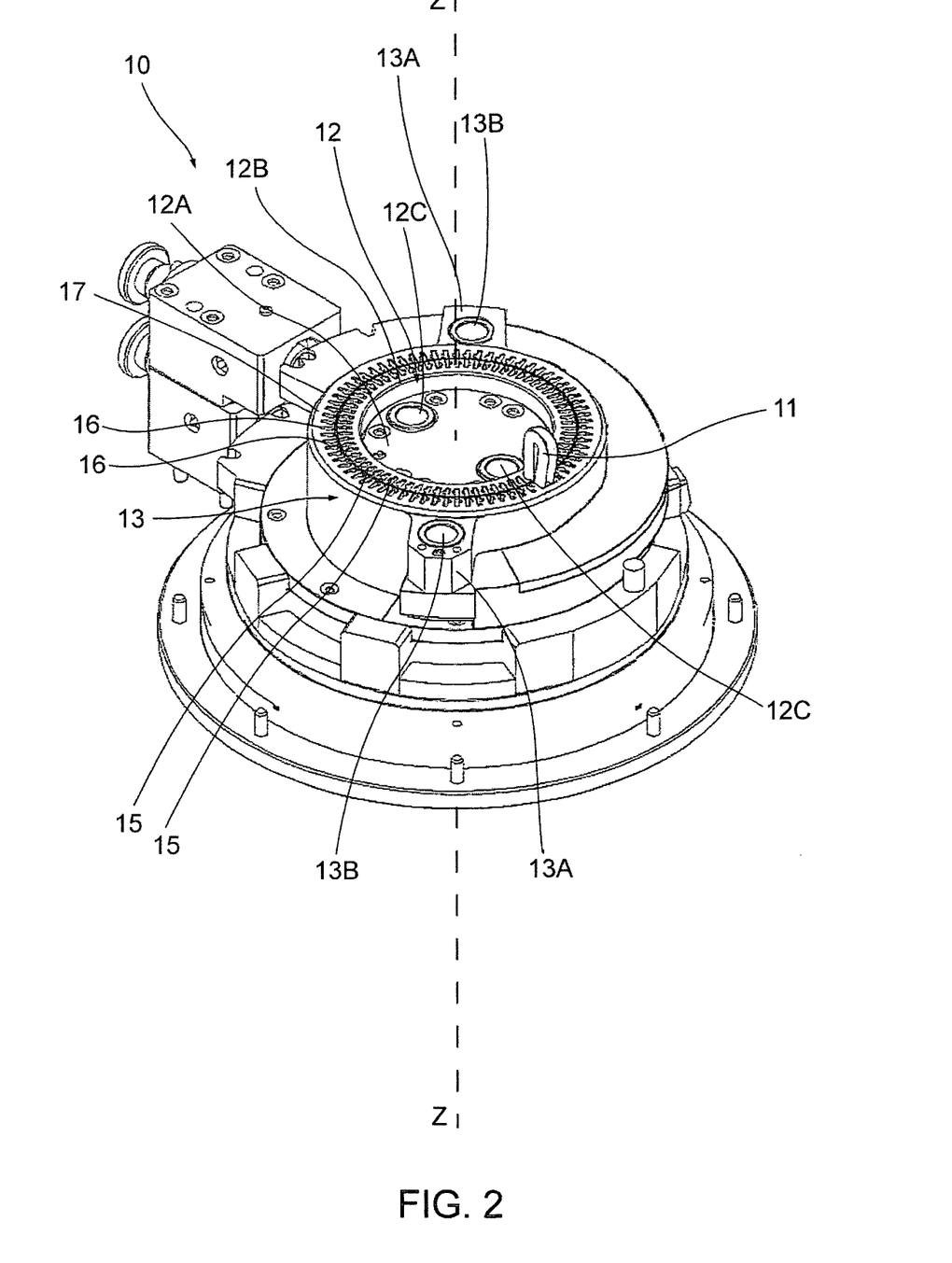
FIG. 2 is an axonometric view in which a possible embodiment of a twisting device is shown, in such a view a bar conductor is inserted into the twisting device.

With reference to FIG. 2, a currently preferred embodiment of a bar electric conductor twisting device 10 is illustrated, suitable for being used in the apparatus 1. The twisting device 10 is suitable for simultaneously twisting a plurality of bar electric conductors 11 (only one of which is represented in FIG. 2) to make stator or rotor winding conductors for an electric machine (not represented), such as an electric generator or an electric motor. With reference to FIG. 1, in the example the twisting device is fixed to a rotating table 5 of the apparatus 1 through which it can subsequently be brought respectively into a loading station 2 so that the bar conductors can be forcibly inserted into the twisting device, into a twisting station 3 for shaping such conductors, and into an extraction station 4 for extracting and removing the shaped bar conductors from the twisting device, and inserting these into a stator or rotor pack (not represented).

Figure 6:
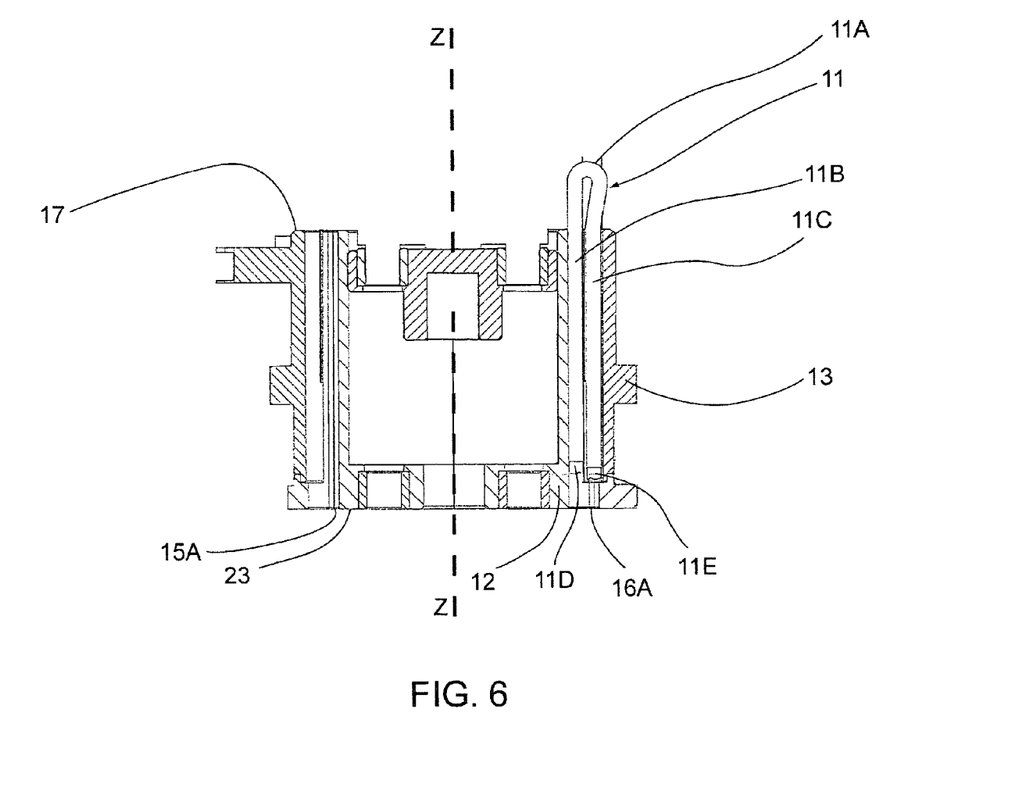
FIG. 6 is a partial section view of the twisting device according to the line A-A of FIG. 3, in which a bar conductor is visible inserted into channels provided in such a device.

With reference to FIG. 6, it should be observed that for the sake of the present description with the expression bar conductors it is understood bar electric conductors which are substantially "U"-shaped or "P"-shaped so as to have a bent portion 11A joined to a first and to a second arm 11B, 11C relatively close to one another or arranged side by side and ending with respective free end portions 11D, 11E. In accordance with a non limiting embodiment, the bar conductors 11 are covered on their surface with an insulation lining made from insulating material, like, for example, a enamel made from insulation resin. Going back to FIG. 2, the device 10 comprises at least one first and one second body 12, 13 extending around a twisting axis Z-Z. Concerning this it should be specified that from now on the term "axial" shall be used to indicate a direction parallel to the twisting axis Z-Z. Moreover, it is worth clarifying that for the sake of the present description the terms "inner" and "outer" used to describe the relative position between parts or elements, shall refer to the shorter or greater distance of such parts or elements from the twisting axis Z-Z, respectively.

In the example, the first body 12 or inner body 12 comprises a central portion 12A and a substantially sleeve-shaped peripheral portion 12B. In accordance with one embodiment a first pair of holes 12C or inner holes 12C is provided on the central portion 12A. On the peripheral portion 12B the body 12 is provided with a first circular array of channels 15, or inner array, having its centre on the twisting axis Z-Z. The second body 13 or outer body 13 extends around the inner body 12 and is coaxial with it. In the example, the outer body has a generally tubular shape and it is provided with two maneuvering portions 13A projecting outwards from two diametrically opposite sides of such a body. On the maneuvering portions 13A a second pair of holes 13B or outer holes 13B are provided, in particular one hole 13B on each maneuvering portion. The outer body 13 is provided with a second circular array of channels 16, or outer array, having its centre on the twisting axis Z-Z.

It is worth underlining that for the sake of the present description with the expression "circular array" referring to the channels of the inner body or of the outer body it is understood an arrangement of the channels such that these are substantially aligned along a circumference lying on a plane perpendicular to the twisting axis and having its centre on such an axis, where the channels may or may not generally be distributed evenly around the twisting axis.

With reference to FIGS. 2 and 6, it can be observed that a channel 15 or inner channel 15 of the inner array and a channel 16 or outer channel 16 of the outer array can be placed side by side and aligned radially to one another to receive the first arm 11B and the second arm 11C of one same bar conductor 11; respectively. For such a purpose it should be observed that for the sake of the present description the terms "radial" and "circumferential" refer to a generic circumference lying on a plane perpendicular to the twisting axis and having centre on such an axis. An example of radial and circumferential direction is indicated by the arrows RR and CC in FIG. 3, respectively. Therefore a channel of the inner array and a channel of the outer array should be considered aligned radially if the sections of such channels lying on a plane perpendicular to the twisting axis comprise respective channel axes aligned radially to one another.

Figure 3:
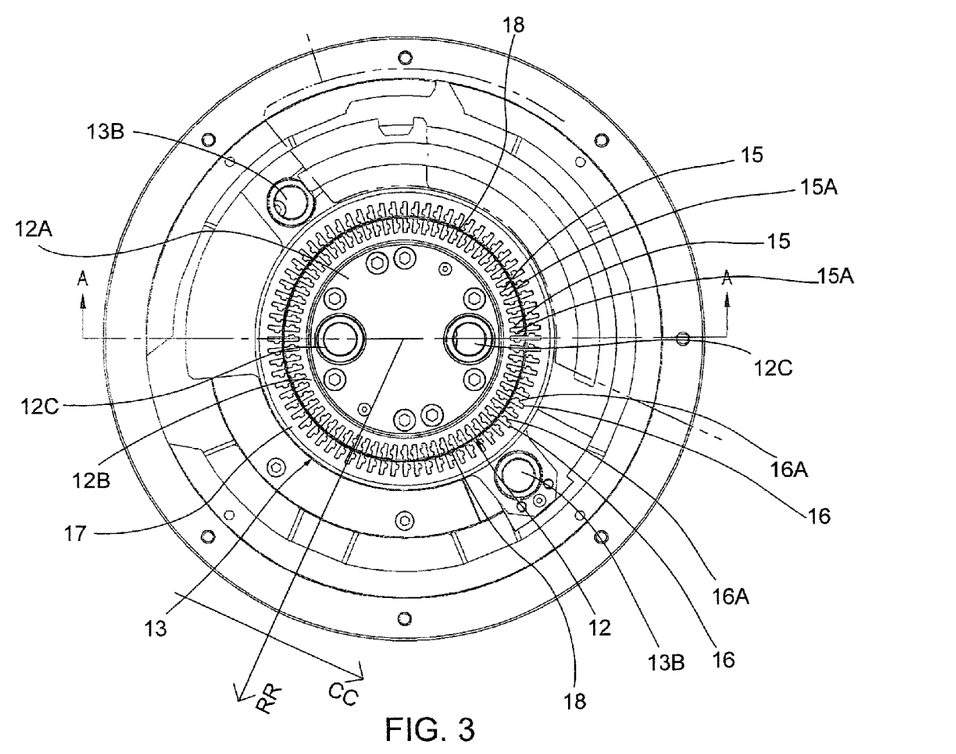
FIG. 3 is a partial top view of the twisting device of FIG. 2.
Figure 4:
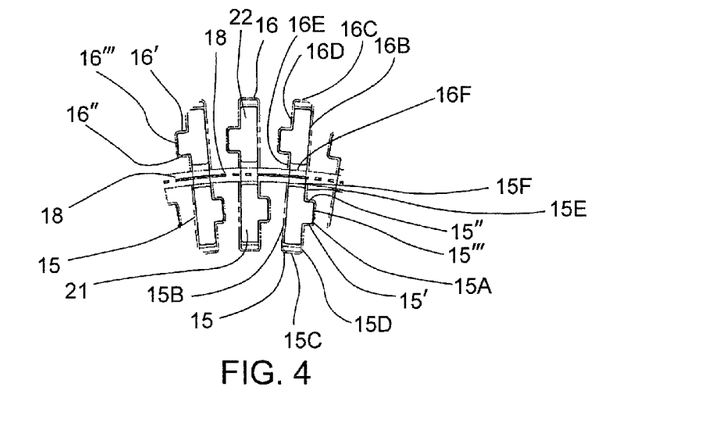
FIG. 4 is a top view of an enlarged detail of FIG. 3, in such a view also some extraction elements belonging to an extractor assembly are represented.

Once the conductor 11 has been inserted into the channels 15, 16, through a first face 17 or insertion face 17 of the device 10, the inner body and/or the outer body can be set in rotation around the twisting axis to move the arms 11B, 11C away from one another by a predetermined amount, normally by a quantity equal to a predetermined number of stator or rotor slots. For such a purpose it should be observed that the inner and outer bodies are preferably adapted to be set in rotation in opposite directions around the twisting axis. Generally, however, it is sufficient to have a relative rotation in opposite directions between such bodies to carry out the twisting operation. In other words, the inner body, for example, could be kept fixed and the outer body could be set in rotation or vice versa, the outer body could be kept fixed and the inner body could be set in rotation. Preferably, the setting of the inner and outer bodies in rotation is carried out by means of a device (not represented since it is known by a man skilled in the art) including a pair of inner actuation bars and a pair of outer actuation bars, which can engage into the aforementioned inner and outer holes 12C, 13B, respectively, and can be set in rotation so as to pull the inner and outer bodies in rotation, preferably in opposite directions. With reference to FIGS. 3 and 4 it can be observed that on the inner body, at each of the inner channels 15, a channel extension groove 15A is formed extending longitudinally in a direction parallel to the twisting axis and projecting from the respective channel in a direction which is circumferential with respect, to the twisting axis. In other words the device comprises a plurality of longitudinal grooves 15A formed in the inner body, each of which communicates with an associated inner channel 15 along the axial extension of such a channel and projects from the latter in a circumferential direction. It should be observed that each groove 15A is suitable for remaining empty when an arm of the bar conductor 11, for example, the arm 11B, is received in the channel from which such a groove projects.

According to one embodiment, the grooves 15A extend along a prevalent axial extension portion of the respective channels. Even more preferably, the grooves 15A extend along the entire axial extension of the respective channels so as to pass the inner body from one end to the other.

Figure 5:
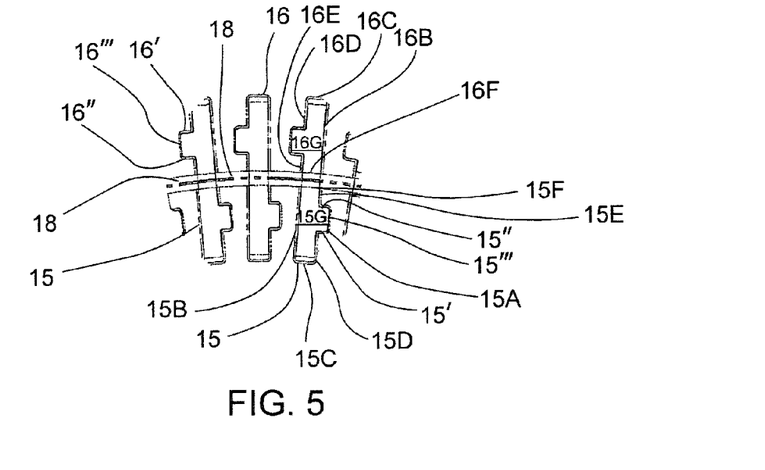
FIG. 5 is a top view analogous to FIG. 4 in which the extraction elements have not been represented.

With reference to FIG. 5, it should be observed that each channel 15 is defined by channel walls 15B, 15C, 15D, 15E, 15F. It should be observed that in the currently preferred embodiment illustrated in the figures, the channel wall 15F is not present. In other words according to such an embodiment each of the channels 15 has a respective open side. However, for the sake of making the description more complete, in the present description the channels 15F shall generally be considered as being defined also by the wall 15F, unless specified otherwise. It should be observed that the wall 15B opposite the groove 15A is conveniently a thrust wall. In other words the wall 15B, which is preferably a flat wall, is suitable for engaging with a face of the arm 11B inserted into the channel 15 so as to exert a thrust action, on such an arm, in the rotation direction of such a channel, i.e. in the rotation direction of the inner body, when such a body is set in rotation to twist the bar conductors 11. This advantageously makes it possible avoid possible damage to the lining of insulating material and/or of the bar conductor due to concentrations of tensions that would occur at the groove 15A if the aforementioned thrust action were carried out by one or more walls of the channel arranged on the same side as such a groove, in the example, the walls 15D, 15E.

Each inner channel 15 includes at least one pair of opposite holding walls 15B, 15D, 15E suitable for simultaneously engaging with an arm of the bar conductor 11 housed in such a channel on two respective opposite sides, in the example the arm 11B. Preferably such opposite holding walls include the thrust wall 15B.

According to one embodiment, the holding walls 15B, 15D, 15E extend in a radial direction whereas the opposite channel walls 15C, 15F extend in a circumferential direction.

According to one particularly preferred embodiment for flat bar conductors, the opposite holding walls 15B, 15D, 15E are relatively closer to one another, whereas the opposite channel walls 15C, 15F are relatively farther away from one another. The groove 15A is also defined by at least one groove wall joined to at least one of the opposing holding walls 15B, 15D, 15E. In the example, the groove 15A is defined by a plurality of groove walls 15', 15", 15'". In particular such walls comprise a pair of opposite groove walls 15', 15" extending in a circumferential direction and an intermediate groove wall 15'" joined to the walls 15', 15" and extending in a radial direction. However, it should be observed that in accordance with a possible embodiment, instead of the groove walls 15', 15", 15'", it could be provided for there to be, for example, a single concave groove wall having its concavity facing the channel 15.

Again with reference to FIG. 5, it can be observed that in accordance with one embodiment each groove 15A and the respective channel 15 have a radial extension defined by at least one of the groove walls 15', 15", 15'", and by at least one of the channel walls 15B, 15C, 15D, 15E, 15F, respectively. In the example, the radial extension of the groove is defined by the walls 15', 15" whereas the radial extension of the associated channel is defined by the channel walls 15C, 15F. In particular it should be observed that the radial extension of the groove 15A is relatively smaller than the radial extension of the respective channel 15. Preferably, each groove is radially offset with respect to the channel 15 from which it projects. Again more in particular, according to an advantageous embodiment, each groove 15A is radially offset towards an annular clearance 18 or separation gap 18 extending between the inner body and the outer body. In the example, inside the gap 18, in particular, at least one separation element or separation sleeve (not represented in the figures) is housed placed between the channels 15 of the inner array and the channels 16 of the outer array. It should be observed that the characteristic of providing radially offset grooves 15A, makes it possible to conveniently optimise the structure of the twisting device and, more in particular, to improve the mechanical bending resistance of each portion of the inner body which is comprised between two directly consecutive channels 15. This is particularly advantageous in the embodiment illustrated in the figures, in which the channels 15 do not have the wall 15F and in which, therefore, such portions of the inner body are essentially cantilevered portions intended to undergo bending stress during the twisting operation.

From another point of view, with particular reference to FIG. 5, in the example illustrated in the figures it can be observed that the channel walls 15B, 15C, 15D, 15E, 15F of each inner channel 15 and the groove walls 15', 15", 15'" of the groove 15A projecting from such a channel, have a profile of the section perpendicular to the twisting axis which is suitable for defining generally an opening 15G. In particular, the opening 15G is substantially T-shaped, in which the leg of the T corresponds to the groove 15A and the cross end of the T, joined to the leg, corresponds to the channel 15. Again, more in particular, it can be observed that in the example embodiment the leg of the T is relatively shorter than the cross end and it is offset with respect to the latter towards the annular clearance 18.

In accordance with the currently preferred embodiment illustrated in the attached figures, a channel extension groove 16A is also provided at each outer channel 16 of the outer body. In the example, the grooves 16A and the outer channels 16 have characteristics identical to those of the grooves 15A and of the inner channels 15. In other words, what has been described above in relation to the grooves 15A and to the channels 15 is valid, mutatis mutandis, also for the grooves 16A and for the channels 16. Again in other words, with reference to FIG. 5, each channel 16 is defined in the example by a plurality of channel walls 16B, 16C, 16D, 16E, 16F corresponding to the channel walls 15B, 15C, 15D, 15E, 15F, respectively and each groove 16A is defined by a plurality of groove walls 16', 16", 16'" corresponding to the groove walls 15', 15", 15'", respectively. Moreover, in the example the channel walls of each outer channel and the groove walls 16', 16", 16'" of the groove 16A projecting from such a channel, have a profile of the section perpendicular to the twisting axis which is suitable for defining an opening 16G as a whole corresponding to the aforementioned opening 15G. The grooves 16A and the channels 16, therefore, shall not be described any further. It is however suitable to underline that in general it is necessary for the extension grooves 15A, 16A to be provided at each of the channels of at least one of the aforementioned inner or outer arrays. In other words, the device 10, according to less preferred embodiments, could only comprise the grooves 15A provided at the channels of the inner body or only the grooves 16A provided at the channels of the outer body. Alternatively, according to an advantageous embodiment, the device 10 comprises both the grooves 15A provided on the inner body and the grooves 16A provided on the outer body. It is worth underlining that in the case in which the grooves 15A, 16A are provided at the channels of both the inner and outer arrays, according to an advantageous embodiment the grooves 15A and 16A projecting from a channel 15 of the inner array and from a channel 16 of the outer array, respectively, which are arranged side by side and radially aligned, project circumferentially in opposite directions.

Figure 7:
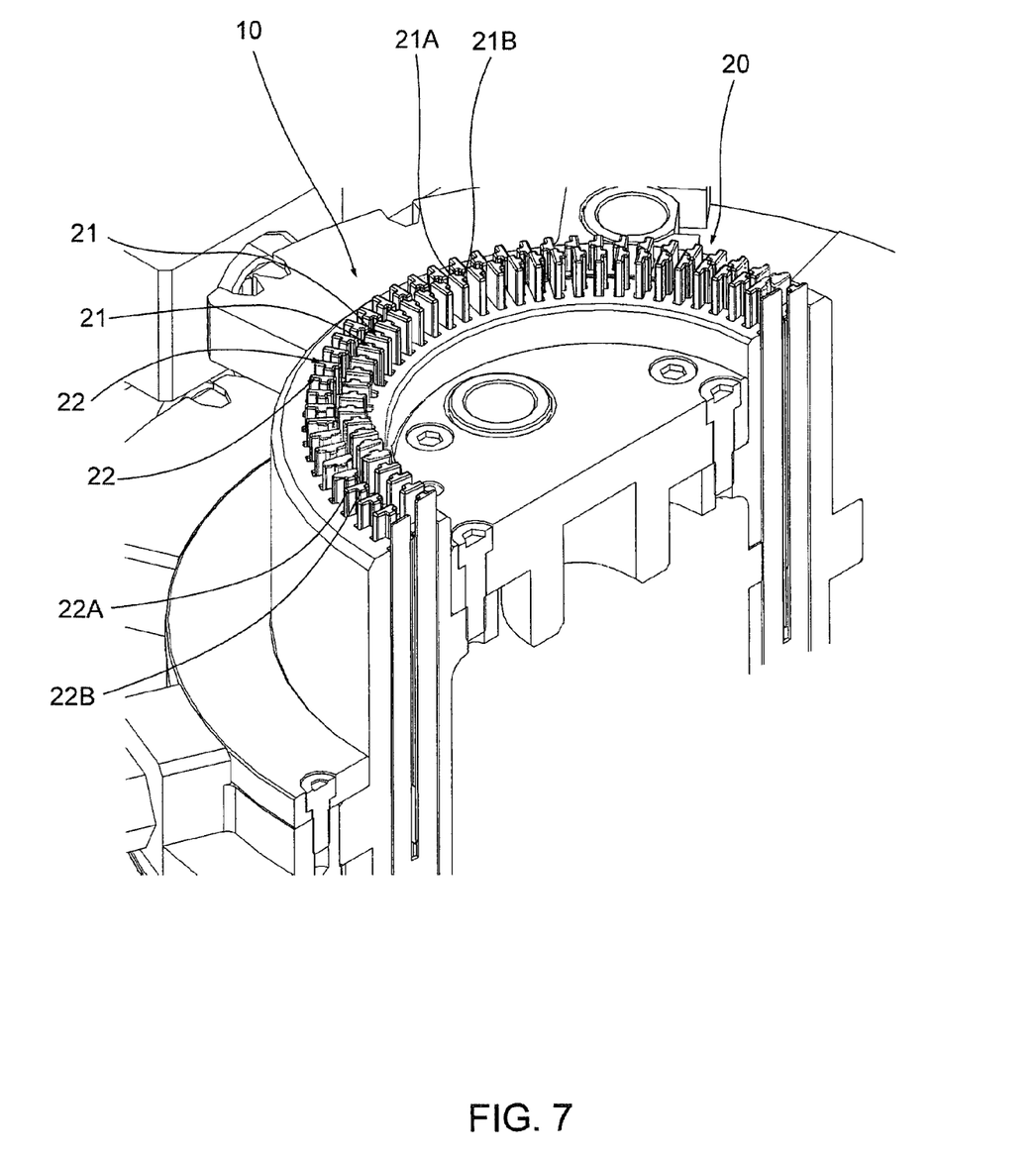
FIG. 7 is a partial axonometric section view of the twisting device of FIG. 2 crossed by the extraction elements of FIG. 4.

With reference now to FIGS. 1 and 7, the apparatus 1 comprises an extractor assembly 20 equipped with at least one circular array of extraction elements 21, 22 or extraction bars 21, 22 to extract the bar conductors from the twisting device 10, normally at the end of the twisting operation. Such an extractor assembly 20 can for example substantially be made as described in the patent application published as US 2009/0265909 and therefore shall not be given a detailed description. In particular, in FIG. 7 a plurality of extraction elements or extraction bars 21, 22 of the extractor assembly 20 are visible. Again more in particular, in the example, the extractor assembly is provided with a first circular array of extraction bars 21, having a relatively greater length, and a second circular array of extraction bars 22, having a relatively shorter length. Such bars 21, 22 can be inserted into the channels 15, 16 of the inner and outer arrays of the twisting device 10, respectively through a second face 23 or extraction face 23 (FIG. 6) of such a device. As can be observed in FIG. 7, each extraction bar 21, 22 extends according to a prevalent longitudinal extension direction and includes an element body or bar body comprising an extraction portion 21A, 22A and a longitudinal rib 21B, 22B projecting from the extraction portion and extending parallel to the prevalent longitudinal extension direction of the extraction bar. Specifically, when one of the bars of 21, 22 is inserted into the twisting device, the extraction portion 21A, 22A is suitable for passing through one of the channels 15, 16 whereas the rib 21B, 22B is suitable for passing through the groove 15A, 16A associated with such a channel. According to a particularly preferred embodiment the extraction portion 21A, 22A is substantially counter-shaped with respect to the channel 15, 16 whereas the rib 21B, 22B is substantially counter-shaped with respect to the extension groove 15A, 16A. For example, in the case in which the aforementioned openings 15G, 16G are substantially T-shaped as discussed above, also the extraction bars 21, 22 would have a respective section, perpendicular to their longitudinal extension direction, which is substantially T-shaped. In particular the legs of the T would correspond to ribs 21B, 22B and the cross ends, of the T, joined to the legs, would correspond to the extraction portions 21A, 22A.

Figure 8:
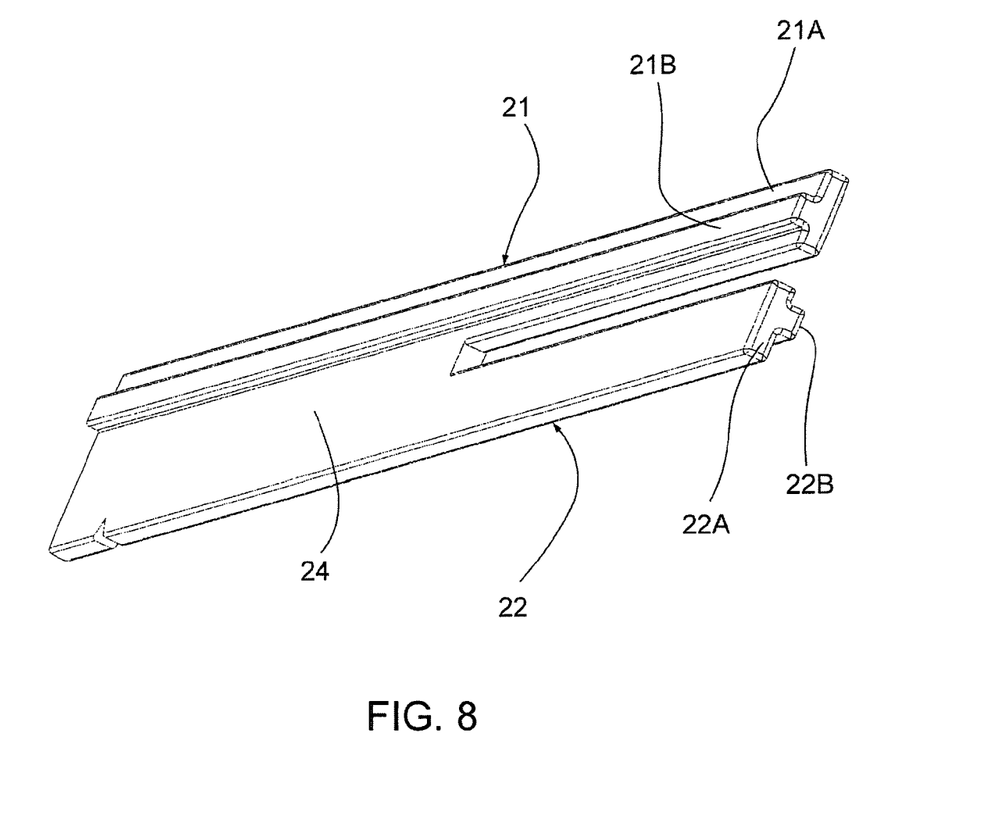
FIG. 8 shows an axonometric view of a possible embodiment of the aforementioned extraction elements.

With reference to FIG. 8, a pair of extraction bars 21, is illustrated, in greater detail with respect to FIG. 7, according to a currently preferred embodiment. As can be observed in FIG. 8, according to such an embodiment an extraction bar 21 of the first array and an extraction bar 22 of the second array are joined to one another through a preferably plate-shaped joint portion 24. More in particular, in the example of FIG. 8 such extraction bars project from an end of the joint portion so that the pair of extraction bars 21, 22 and the joint portion overall have a fork shape. In the example of FIG. 7, each extraction bar of the first array is joined to an adjacent extraction bar of the second array in the way described above.

Based upon what has been described above, it is thus possible to understand how a twisting device according to the present description is such as to achieve the aforementioned purposes. Moreover, it is possible to understand how such purposes are achieved also by an extractor assembly according to the present description.

The fact of providing a twisting device including at least one circular array of channels each of which is associated with a circumferentially projecting groove, makes it possible to carry out the extraction of the bar conductors from the twisting device by using extraction bars equipped with a structure stiffened with a reinforcement rib intended to be received in a respective groove during the extraction step. Therefore, this advantageously makes it possible to substantially reduce or avoid, with the same section of the channels perpendicular to the twisting axis and, thus, with the same cross section of the bar conductors, the possibility of the extraction bars bending during the extraction step.

It should be evident that, in order to provide for stator or rotor windings having any number of phases, a twisting device according to the present description can comprise further bodies coaxial with the aforementioned first and second body, in particular provided with respective channels and relative channel extension grooves. In the same way it should be obvious that an extractor assembly according to the present description can comprise any number of circular arrays of extraction elements.

Without affecting the principle of the invention, the embodiments and the manufacture details can be widely varied with respect to what has been described and illustrated purely as a non limiting example, without for this reason departing from the scope of the invention as defined in the attached claims.

The invention claimed is:

1. Twisting device (10) adapted to simultaneously twist a plurality of electric bar conductors (11) for making a stator or rotor winding for an electric machine, comprising:
   at least one first body (12) extending around a twisting axis (Z-Z) and comprising a first circular array of channels (15) having centre on such an axis (Z-Z); and
   at least one second body (13), extending around and coaxial with the first body (12), comprising a second circular array of channels (16) with centre on the twisting axis (Z-Z);
a channel (15) of said first array and a channel (16) of said second array being adapted to be placed side by side and aligned radially (RR) to one another with respect to the twisting axis (Z-Z) to respectively receive a first and a second arm (11B, 11C) of one of said bar conductors (11), the first and/or second body (12, 13) being adapted to be set in rotation around said axis (Z-Z) to move such arms apart (11B, 11C) by a predetermined amount;
   the twisting device (10) being characterised in that it comprises, associated with each of the channels (15) of at least one of said first and second array, a channel extension groove (15A) extending longitudinally in a direction parallel to the twisting axis (Z-Z) and projecting from the respective channel (15) in a direction (CC) circumferential with respect to said axis (Z-Z).

2. Twisting device (10) according to claim 1, comprising channel walls (15B, 15C, 15D, 15E, 15F) suitable for defining the channel (15) from which the channel extension groove (15A) projects and at least one groove wall (15', 15'', 15''') joined to the channel walls (15B, 15C, 15D, 15E, 15F) which is suitable for defining said groove (15A).

3. Twisting device (10) according to claim 2, wherein said channel walls (15B, 15C, 15D, 15E, 15F) include at least one pair of opposite holding walls (15B, 15D, 15E) suitable for engaging, on two opposite sides, with an arm (11B) of one of said bar conductors (11) housed in the channel (15).

4. Twisting device (10) according to claim 3, wherein said opposite holding walls (15B, 15D, 15E) extend in the radial direction (RR).

5. Twisting device (10) according to claim 3, wherein said opposite holding walls (15B, 15D, 15E) comprise a thrust wall (15B) opposite to said groove (15A), the thrust wall (15B) being suitable for engaging a face of said arm (11B) housed in the channel (15) to exert a thrust action on such an arm (11B) in the rotation direction of such a channel when the body (12) on which such a channel is formed is set in rotation to twist said bar conductors (11).

6. Twisting device (10) according to claim 2, comprising a plurality of groove walls (15', 15", 15''') suitable for defining said groove (15A).

7. Twisting device (10) according to claim 6, wherein said groove walls (15', 15", 15''') comprise a pair of opposite groove walls (15', 15") which extend in the circumferential direction (CC).

8. Twisting device (10) according to claim 2, wherein said groove (15A) and the respective channel (15) have a radial extension defined by said groove wall (15', 15", 15''') and by said channel walls (15B, 15C, 15D, 15E, 15F), respectively, the radial extension of said groove (15A) being relatively smaller than the radial extension of the respective channel (15).

9. Twisting device (10) according to claim 8, wherein said groove (15A) is radially offset (RR) with respect to the channel (15) from which it projects.

10. Twisting device (10) according to claim 9, wherein said first and second body (12, 13) are separated by a separation gap (18) and wherein said groove (15A) is radially offset (RR) towards said gap (18).

11. Twisting device (10) according to claim 1, wherein said groove (15A) is suitable for remaining empty when an arm (11B) of one of said bar conductors (11) is housed in the channel (15) from which such a groove projects (15A).

12. Twisting device (10) according to claim 1, wherein said groove (15A, 16A) is formed at each channel (15, 16) of said first and second array, and wherein the grooves (15A, 16A) respectively projecting from a channel (15) of said first array and from a channel (16) of said second array, which are arranged side by side and aligned radially (RR), project circumferentially (CC) in opposite directions.

\* \* \* \* \*